(12) United States Patent
Nakamura

(10) Patent No.: US 6,507,376 B2
(45) Date of Patent: Jan. 14, 2003

(54) DISPLAY DEVICE FORMED ON SEMICONDUCTOR SUBSTRATE AND DISPLAY SYSTEM USING THE SAME

(75) Inventor: Ryo Nakamura, Chiba (JP)

(73) Assignee: Kawasaki Microelectronics, Inc., Mihama-ku (JP)

( * ) Notice: Subject to any disclaimer, the term of this patent is extended or adjusted under 35 U.S.C. 154(b) by 0 days.

(21) Appl. No.: 10/022,720

(22) Filed: Dec. 20, 2001

(65) Prior Publication Data

US 2002/0080294 A1 Jun. 27, 2002

(30) Foreign Application Priority Data

Dec. 25, 2000 (JP) .......................... 2000-392796

(51) Int. Cl.[7] .............................................. G02F 1/134
(52) U.S. Cl. ......................................................... 349/38
(58) Field of Search ....................... 349/38, 39; 257/59, 257/72

(56) References Cited

U.S. PATENT DOCUMENTS

| | | | |
|---|---|---|---|
| 4,239,346 A | * 12/1980 | Lloyd .......................... 345/205 |
| 5,801,400 A | 9/1998 | Nishihata | |
| 6,057,897 A | 5/2000 | Ichikawa et al. | |
| 6,137,551 A | * 10/2000 | Jeong .......................... 257/59 |

FOREIGN PATENT DOCUMENTS

| | | |
|---|---|---|
| EP | 0507639 | 6/1992 |
| JP | 4-56827 | 2/1992 |
| JP | 5-93922 | 4/1993 |
| JP | 5-273592 | 10/1993 |
| JP | 8-146458 | 6/1996 |
| JP | 8-190106 | 7/1996 |
| JP | 8-328034 | 12/1996 |
| JP | 2000-305105 | 11/2000 |

\* cited by examiner

Primary Examiner—James Dudek
(74) Attorney, Agent, or Firm—Oliff & Berridge, PLC

(57) ABSTRACT

A liquid crystal display device includes a plurality of display elements arranged in a first and a second direction on a surface of a semiconductor substrate. Each of the display elements includes a transistor formed on the semiconductor substrate; a pixel electrode driven by the drain output of the transistor; and a capacitor for storing the drain output of the transistor. The capacitors each include a diffusion region formed in the surface of the semiconductor substrate and an upper electrode facing with the diffusion region with an insulating film between them. The capacitor diffusion regions of adjacent two display elements arranged in the second direction extend along a border between the two elements and merge with each other at the border.

25 Claims, 6 Drawing Sheets

DISPLAY DEVICE FORMED ON SEMICONDUCTOR SUBSTRATE AND DISPLAY SYSTEM USING THE SAME

BACKGROUND OF THE INVENTION

1. Field of Invention

This invention relates to reflective type active-matrix liquid crystal display devices and systems in which a liquid crystal layer is stacked on a driver layer formed on a semiconductor substrate.

2. Description of Related Art

Recently, liquid crystal displays have become widely used in various fields. In one type of liquid crystal display device, a liquid crystal layer is placed on and integrated with a driver layer formed on a semiconductor substrate. This type of liquid crystal display device is reflective and is combined with a light source for illuminating the front side of the display device to constructs a display system.

In the driver layer, a plurality of display elements, each including a transistor (a switching device) to drive a pixel electrode, are arranged in the form of a matrix on the semiconductor substrate. A pixel signal in accordance with an image signal is input to the display element and the output of the transistor in the display element drives the pixel electrode, whereby the molecular orientation of a portion of the liquid crystal on the pixel electrode (reflecting mirror) is controlled. As a result, the state of reflection of external light illuminating the pixel electrode is controlled in accordance with the pixel signal. By projecting the reflected light on a screen, the display system produces an image in accordance with the image signal.

For example, Japanese Patent Publication No. 2995725 (Laid-open Patent Hei 8-146458) discloses a liquid crystal display device formed on a semiconductor substrate in which shift in drain potentials caused by photo-carriers is minimized without adversely affecting the operation of pixel transistors.

FIG. 5 shows a conceptual sectional view of a known liquid crystal display. Referring to FIG. 5, a panel forming the liquid crystal display device includes a liquid crystal driver layer 102 formed on a surface of a silicon substrate 100 and a liquid crystal layer 104 formed over the liquid crystal driver layer 102.

The liquid crystal driver layer 102 formed on the surface of the silicon substrate 100 includes a switching transistor 106 having a source 106a, a drain 106b, and a gate 106c; a capacitor 108 containing a diffusion region 108a and an upper electrode 108b; and a pixel electrode (reflective mirror) 110 formed above the silicon substrate 100. The pixel electrode is connected to the drain 106b of the transistor 106, and is driven by an electric signal output at the drain.

The transistor 106 controls the orientation of portion of the liquid crystal on the corresponding pixel electrode 110. When a select line selects the transistor 106, the transistor 106 turns ON. While the transistor is ON, a pixel signal in accordance with an image signal is input to the source 106a. The signal is transferred to the drain 106b, and the output signal is thereby supplied to the pixel electrode 110 connected to the drain 106b. The output signal is also supplied to the upper electrode 108b of the capacitor 108. The capacitor 108 stores and maintains the output signal for a period during which the transistor 106 is OFF and minimizes a shift in the potential applied to the pixel electrode 110. As a result, an image can be stably displayed on the liquid crystal.

The size of the pixel represented by the size of the pixel electrode 110 ranges from 10 $\mu$m×10 $\mu$m to 30 $\mu$m×30 $\mu$m.

The liquid crystal layer 104 includes a liquid crystal 116 which is held between the pixel electrode 110 and a transparent electrode 114, and a glass plate 118 at the top.

A plurality of display elements each having the transistor 106, the capacitor 108 and the pixel electrode 110 are arranged in a form of an array on the silicon substrate 100 to form a display device. Each of the display elements is provided for each of the pixels. Controlling the pixel signal input to the pixel transistors 106 can control the orientation of portions of the liquid crystal 116 on the pixel electrodes 110. Therefore, when an incident light enters from the surface of the glass plate 118, an intensity of the light reflected by each of the pixel electrodes 110 is controlled by controlling the pixel signal. As a result, a desired image can be formed.

In order to improve the quality of the image, an increase in the number of pixels is required. To fulfill this requirement, an increased number of display elements should be arranged on a surface of a semiconductor substrate with a commercially acceptable area. As a result, a pixel size, or an area of the surface available for each display element becomes smaller. Because a high voltage is required to control the molecular orientation of the liquid crystal, however, the size of the transistor in the display element cannot become miniaturized even with an advance of the semiconductor fabrication process technology. Thus, the area that is provided for forming the capacitor tends to be decreased. The reduction of the area of the capacitor and resulting reduction of the capacitance to store the output signal may result in an instability of the image.

SUMMARY OF THE INVENTION

In order to solve the problems described above, it is an object of this invention to provide a display device and a display system including the display device that provides a sufficient area for capacitors even when the pixel size is reduced.

An exemplary embodiment of the display device according to the invention comprises an array of display elements arranged in a first and a second direction. Each of the display elements comprises a transistor including a source and a drain diffusion region formed in the surface of the semiconductor substrate, a capacitor, and a pixel electrode disposed over the surface of the semiconductor substrate. The drain diffusion region outputs an output signal, the capacitor stores the output signal, and the pixel electrode is driven by the output signal. The capacitor comprises a capacitor diffusion region formed in the surface of the semiconductor substrate, an insulating film disposed on the capacitor diffusion region, and a capacitor electrode disposed on the insulating film.

The array of display elements includes a first display element, a second display element arranged adjacent to the first display element in the second direction, and a third display element arranged adjacent to the second display element in the second direction. And the capacitor diffusion regions of the first and the second display elements extend along at least substantially an entire length of a border between the first and the second display elements and merge with each other at the border.

Preferably, an entire area of the surface of the semiconductor substrate provided for forming the first display element has a same conduction type before forming the capacitor diffusion region.

Preferably, the capacitor diffusion region of the first display element has a first conduction type and is formed in the surface of the semiconductor substrate having the first conduction type.

Other exemplary embodiments of the display devices according to this invention comprise an array of display elements arranged in a first and a second direction. The array of display elements includes a first display element, a second display element arranged adjacent to the first display element in the second direction, a third display element arranged adjacent to the second display element in the second direction. The array further includes a fourth display element arranged adjacent to the first display element in the first direction and a fifth display element arranged adjacent to the second display element in the first direction, the fourth and the fifth display element are arranged adjacent with each other in the second direction. The capacitor diffusion regions of the first, the second, the fourth and the fifth display elements merge with each other; and a contact to supply an electric potential to these capacitor diffusion regions is provided at a position surrounded by the capacitor electrodes of the first, the second, the fourth, and the fifth display elements.

Preferably, the capacitor electrodes of the first and the second display elements extend along substantially the entire length of the border between the first and the second display elements.

Other exemplary embodiments of the display devices according to this invention comprise an array of display elements arranged in a first and a second direction. The array of display elements includes a first display element, a second display element arranged adjacent to the first display element in the second direction, and a third display element arranged adjacent to the second display element in the second direction. The transistors of the second and the third display elements share a common gate electrode extending in the second direction beyond a border between the second and the third display elements.

Preferably, the array of display elements includes a select line to select display elements arranged in the second direction including the first, the second, and the third display elements; and the select line includes the common gate electrode and a wiring connected to the common gate electrode. The wiring extends in the second direction over the capacitor electrodes of the first and the second display elements.

Preferably, the array of the display elements includes a plurality of signal lines extending in the first direction to input pixel signals to the display elements.

Other exemplary embodiments of the display devices according to this invention comprise an array of display elements arranged in a first and a second direction. The array of display elements includes a first display element, a second display element arranged adjacent to the first display element in the second direction, and a third display element arranged adjacent to the second display element in the second direction. And the array of display elements includes a select line to select display elements arranged in the second direction including the first, the second, and the third display elements. The select line includes a wiring extending in the second direction over the capacitor electrodes of the first and the second display elements.

BRIEF DESCRIPTION OF THE DRAWINGS

Various exemplary embodiments of this invention will be described in detail with respect to the following drawings, in which like reference numerals indicate like elements, and wherein.

DETAILED DESCRIPTION OF PREFERRED EMBODIMENTS

This invention was first described in Japanese Patent Application No. 2000-392796, which is incorporated by reference in its entirety.

Figure 6:
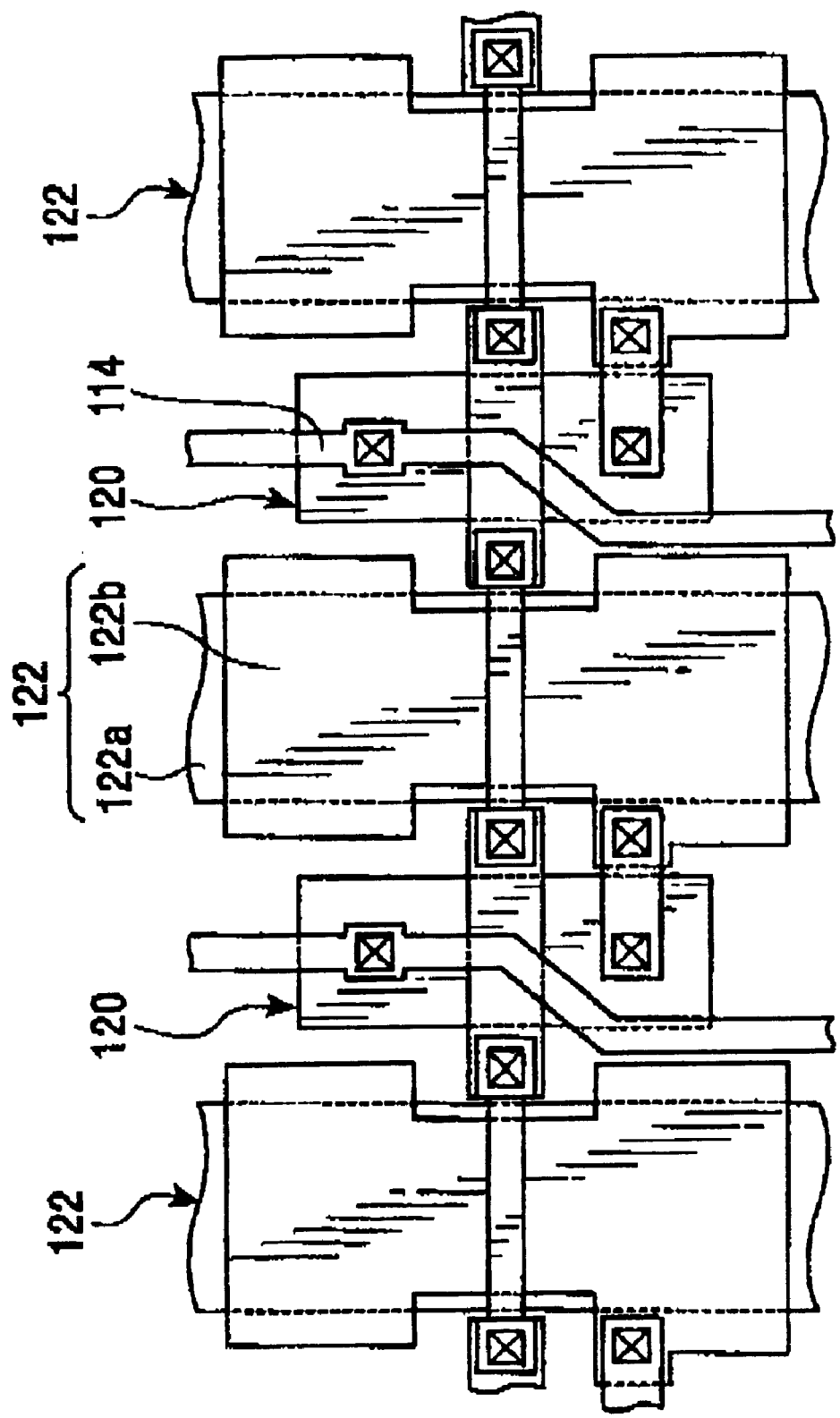
FIG. 6 is a plan view schematically showing an exemplary liquid crystal display device prepared according to this invention for explaining a problem to be solved.

FIG. 6 is a plan view of an exemplary display device designed by the inventor for explaining the problem to be solved. That is, in FIG. 6, a transistor 120 and a capacitor 122 formed with a diffusion region 122a and a upper electrode 122b are alternately arranged side by side in the horizontal direction.

A high voltage of approximately 10 V to 20 V is output from the drain of transistor 120 and supplied to the pixel electrode for controlling the orientation of the liquid crystal. The same high voltage is also supplied to the capacitor 122. Therefore, the transistor 120 and the capacitor 122 must be tolerant to high voltages.

As described above, the transistor and the capacitor are arranged adjacent with each other. Therefore, a high voltage difference of approximately 10 V to 20 V may be produced between diffusion regions forming the source and drain of the transistor (source and drain diffusion regions) and the diffusion region forming the lower electrode of the capacitor (capacitor diffusion region), which are formed adjacent with each other in the surface of the same semiconductor substrate. To be tolerant to such high voltage, an isolation region having a width of approximately 1.5 $\mu$m to 3 $\mu$m should be provided between the source and drain diffusion regions and the capacitor diffusion region.

Because such a large isolation width is necessary, it becomes difficult to provide a sufficient area of the capacitor, as the pixel size becomes smaller. This may causes instability of the image due to a light-induced leakage, and may limit the improvement of the resolution of the display device.

With reference to the accompanying drawings, display devices according to embodiments of this invention will now be described in detail.

Figure 1:
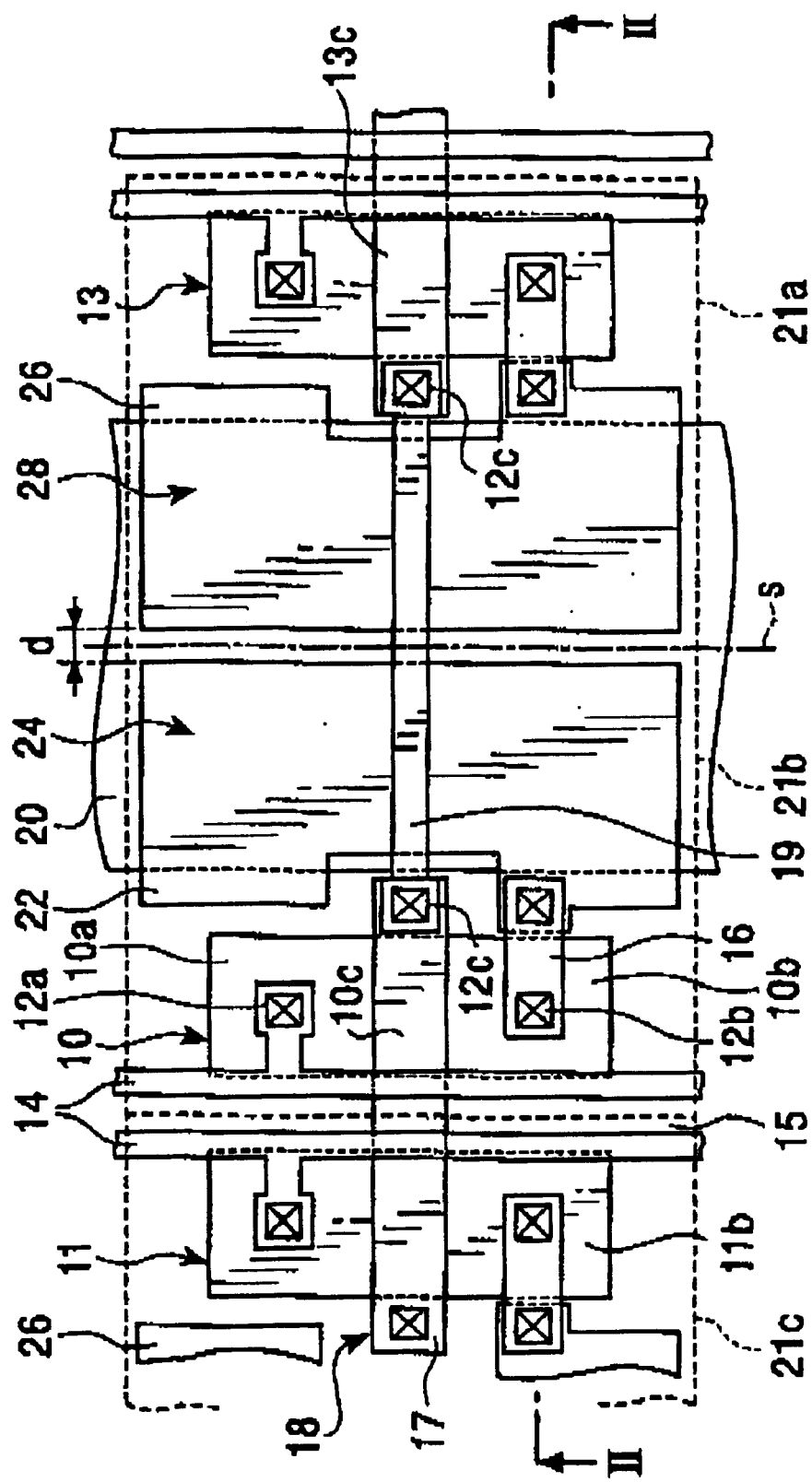
FIG. 1 is a plan view schematically showing a liquid crystal display device according to a first embodiment of the present invention.

FIG. 1 is a plan view schematically showing an arrangement of a display device according to an embodiment of this invention. To simplify the drawing, arrangement of the liquid crystal layer is omitted in this figure. Also, pixel electrodes and a light blocking layer that will be explained later are not shown in this figure. Only the arrangement of transistors and capacitors formed in and in the vicinity of the surface of semiconductor substrate and wiring used to connect between them are shown.

According to the display device of this embodiment, two capacitors or two transistors are arranged so as to be adjacent to each other in the second direction, differing from the first direction, that is, the direction of the signal lines. Thus, in the display device of this embodiment, transistors and capacitors in display elements, which are adjacent to each other in the second direction, are arranged back to back, that is, they exhibit line symmetry.

FIG. 1 shows three of the display elements formed on respective areas on a surface of a semiconductor substrate shown by broken lines 21a, 21b and 21c. The transistor 13 and the capacitor 28 forms the first display element, the transistor 10 and the capacitor 24 forms the second display element, and the transistor 11 and a capacitor not shown in the figure forms the third display element.

As shown in FIG. 1, in the liquid crystal display device of the embodiment, the transistor 11 in the third display element and the transistor 10 in the second display element are arranged adjacent to each other in the second direction (which is the horizontal direction in FIG. 1). The capacitor 24 in the second pixel and the capacitor 28 in the first pixel are arranged adjacent with each other in the second direction, and share a diffusion region 20 including diffusion regions of these two capacitors 24 and 28. A set of the transistor 10 and the capacitor 24 in the second pixel and a set of the transistor 13 and the capacitor 28 in the first pixel are arranged back to back so as to exhibit line symmetry (which in this case is bilateral symmetry) with respect to the center line s between the two capacitors 24 and 28.

The transistor 10 has a source 10a and a drain 10b diffusion regions formed in the surface of a semiconductor substrate and a channel region between them. A gate 10c formed of polycide (a stack of a polycrystalline silicon layer and a metal silicon layer on the polycrystalline silicon layer) is disposed, via a gate insulation film, on the channel region.

The transistor 10 in the second pixel element and the transistor 11 in the third pixel element are arranged on either side of a border between the second and the third pixel element. That is, active regions for forming source, drain and channel regions of the transistors 10, 11 are formed in respective areas in the surface of the substrate provided for forming the second and the third display elements 21b and 21c. Also, an isolation region 15 for isolating between these active regions is provided on the border. The gates of transistors 10 and 11 are both formed with a polycide gate electrode 17 that extends in the second direction beyond the border between the second and the third display elements. That is, the transistors 10 and 11 share the common gate electrode 17.

The source 10a of the transistor 10 is connected to the signal line 14 extending in the first direction (which is the vertical direction in FIG. 1) through a contact 12a. The drain 10b is connected through a contact 12b to a wiring 16 and to an upper pixel electrode, or a reflective mirror, which will be described later.

The gates 10c and 13c of transistors 10 and 13, which are arranged in the second direction, between which the capacitors 24 and 28 are placed, are connected to each other through contacts 12c and a wiring 19. Thereby, a select line 18 extending in the second direction, which is substantially orthogonal to the signal line 14, is formed.

The capacitors 24 and 28 share a common diffusion region 20, which forms the lower electrodes of these capacitors. Due to the lower electrodes of the capacitors 24 and 28 are kept at the same potential, the capacitor diffusion regions of the capacitors 24 and 28 can be merged with each other without providing an isolation region between them. Therefore, the capacitor 24 of the second pixel element is formed with a portion of the common diffusion region 20 and the capacitor electrode 22 disposed over the portion of the common diffusion region. The capacitor 28 of the first pixel element is formed with another portion of the common diffusion region 20 and the capacitor electrode 26 disposed over the portion of the common diffusion region 20.

In other words, capacitor diffusion regions of the first and the second pixel elements are formed or extend along the border between these two display elements (portion of the center line s between the two display elements), and merge with each other at the border to form the common diffusion region 20.

Figure 2:
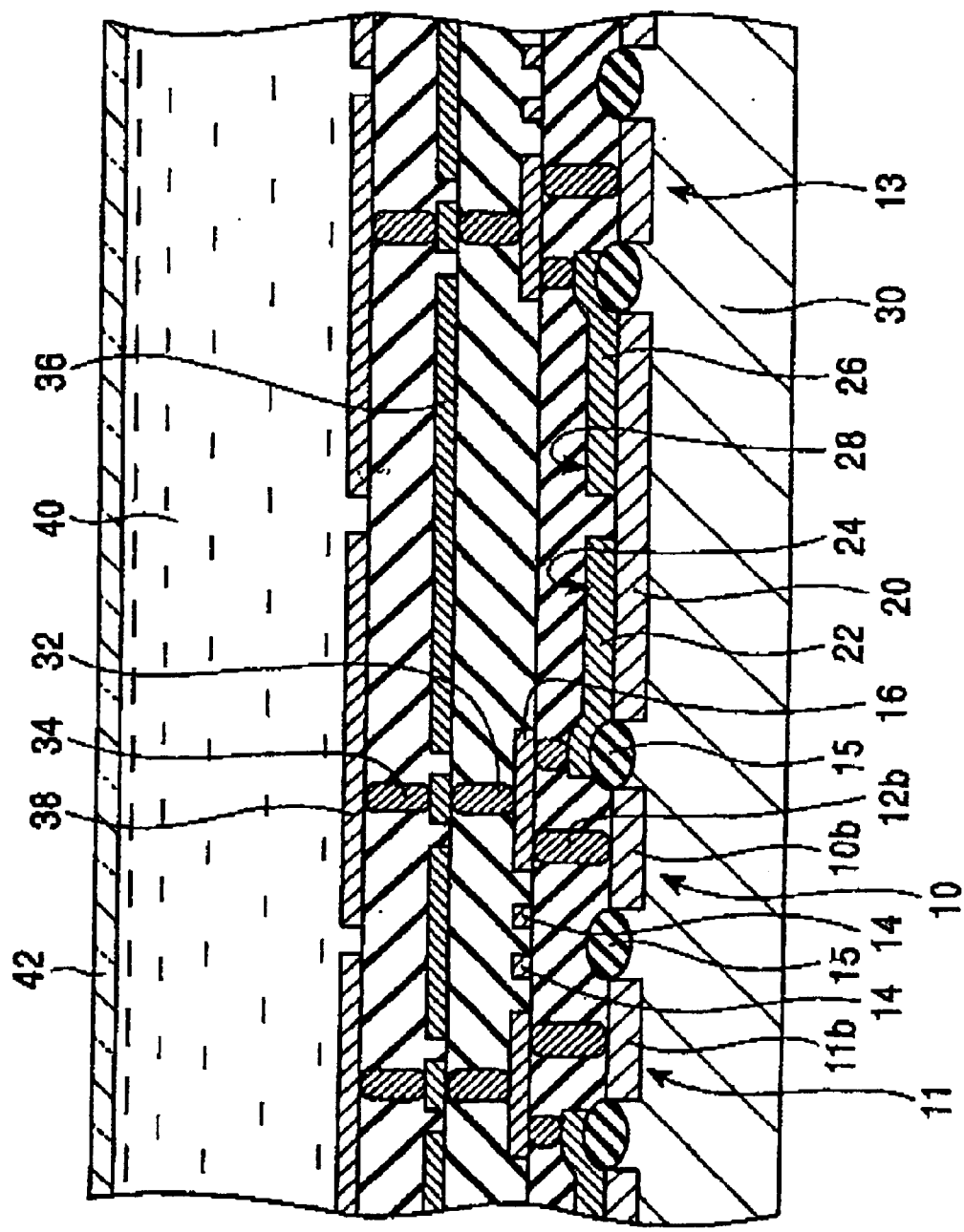
FIG. 2 is a sectional view taken along the line II—II of FIG. 1.

FIG. 2 shows a sectional view taken along the line II—II of FIG. 1. Although the liquid crystal layer is omitted in FIG. 1, the sectional view shown in FIG. 2 includes the liquid crystal layer.

As shown in FIG. 2, the transistors 10 and 11 and the capacitors 24 and 28 are formed to be adjacent to each other on the surface of a semiconductor substrate 30. The active regions of the transistors 10 and 11 are separate with each other by an isolation region 15. Also, the common diffusion region 20 of the capacitors 24 and 28 is separate from the active region of the transistor 10 by another isolation region 15.

On the other hand, the diffusion regions of the capacitors 24 and 28 are continuously formed as the common diffusion region 20, without forming an isolation region between them. The capacitors 24 and 28 include the capacitor electrodes 22 and 26, respectively, disposed over respective portions of the common diffusion region 20. Although not shown in the figure, the capacitor electrodes 22, 26 are separated from the common diffusion region 20 by a capacitor insulating film. Although not shown in the sectional view, patterning the same polycide film used for forming the capacitor electrodes 22 and 26 forms the gates of the transistors 10 and 11. The gates are also separate from the respective active regions by a gate insulating film, which may be formed simultaneously with the capacitor insulating film.

The drain 10b of the transistor 10 is connected to the capacitor electrode 22 of the capacitor 24 through the contact 12b and the wiring 16. An electric potential, such as a ground potential, is supplied to the common diffusion region 20, which forms the lower electrodes of the capacitors 24 and 28 through a contact (not shown). Accordingly, the output of the drain 10b is stored by the capacitor 24 for the period during which the transistor 10 is OFF.

As the potential of the common diffusion region, for example, a ground potential (GND) is supplied when a p-type diffusion region is formed in a surface of a p⁻ semiconductor substrate. On the other hand, a power supply potential (Vdd) is supplied when an n-type diffusion region is formed in the surface of the p⁻ semiconductor substrate.

The drain 10b of the transistor 10 is connected to a pixel electrode 38 through a via 32, a light blocking layer 36 made of metal, and another via 34. On the pixel electrode 38, a liquid crystal 40 which is held between the pixel electrode 38 and a liquid crystal counter electrode (transparent electrode) 42 is provided.

The light blocking layer 36 is provided to block the incident light entering from the liquid crystal side, and to prevent the incident light from reaching the semiconductor substrate on which the transistors and capacitors are formed. For this purpose, the light blocking layer 36 is provided at the gaps between the pixel electrodes throughout the array of the pixel elements.

In this embodiment, the common diffusion region 20 is shared by the adjacent capacitors 24 and 28. Therefore, an isolation region between the diffusion regions of the two adjacent capacitors 24 and 28, which requires an isolation width of about 1.5 µm to 3.0 µm, is not needed. On the other hand, capacitor electrodes 22 and 26 should be electrically isolated from each other, and cannot be formed continuously.

Compared with the isolation between diffusion regions, however, the isolation between polycide electrodes can be provided with a smaller space. The space between the capacitor electrodes 22 and 26 can be reduced to the smallest size permitted by the production process. That is, for example, space between the capacitor electrodes 22 and 26 (represented by symbol d in FIG. 1) can be reduced to approximately 0.5 µm to 0.6 µm in this embodiment. As a result, the space between the capacitors 24 and 28 in this embodiment, which is determined by the space between the capacitor electrodes 22 and 26, can be significantly reduced compared with the layout shown in FIG. 6.

The reduction in the space required for the isolation can be added to the capacitor area, and hence the capacitance can be increased. Specifically, when the pixel size is reduced to 10 µm×10 µm, a conventional design can only achieve about 30 µm² for the capacitor area between the capacitor diffusion region and the capacitor electrode. In contrast, according to the present embodiment, an area of about 37.8 µm² can be achieved.

In the embodiment shown in FIG. 1, the transistors 10 and 11 in the second and the third display elements share the common gate electrode 17. Connecting the common gate electrodes with the wiring extending over the upper electrodes 22 and 26 of the capacitors 24 and 26 forms the select line 18. Such construction of the select line is also advantageous to increase the area that can be provided for the capacitor.

At first, because the gates of adjacent transistors 10 and 11 share the common gate electrode 17, there is no need to provide contacts to connect the gate electrodes of these transistors with each other, which are required in the layout shown in FIG. 6. Therefore, the area required for placing the transistors is minimized.

Secondly, because the wiring 19 extending over the capacitor electrodes is provided for connecting the common gate electrode 17, the dimension of the capacitor electrodes in the first direction (vertical direction) can be maximized. As shown in FIG. 1, the capacitor electrodes 22 and 26 extend along substantially an entire length of the border between the first and second display elements. In other words, the dimension of the capacitor electrodes 22 and 26 is substantially equal to the dimension of the display element in the first direction.

In the embodiment shown in FIG. 1, the signal lines 14 are arranged straightly in the first direction (vertical direction). As a result, the signal line can be made with a simple pattern. Further, the capacitance (mainly the capacitance between the signal line 14 and the semiconductor substrate 30) and resistance of the signal line are reduced.

In the case of the layout shown in FIG. 6, contacts are provided to connect the gate electrodes of transistors of the adjacent display elements with each other. Therefore, the signal line 114 is arranged so as to be prevented from touching the contacts, and cannot be arranged straightly. On the other hand, because the adjacent transistors 10 and 11 share the common gate electrode 17, it is unnecessary to provide contacts on the gate electrode 17 between the transistors 10 and 11. Therefore, the signal lines 14 can be arranged straightly.

In the embodiment shown in FIG. 1, the select line 18 is also arranged straightly. That is, the transistors 10 and 11 in the second and the third display elements share the common gate electrode 17 that extends straightly in the second direction. This common gate electrode 17 is connected to the wiring 19 that also extends straightly in the second direction over the capacitor electrodes 22 and 26 of the capacitors of the first and the second display elements. Therefore, the select line can be formed with a simple pattern.

Further, the total length of the common gate electrodes for the transistors in the display elements arranged in the second direction can be minimized, because the gates of every two adjacent transistors are formed with the common gate electrodes. In addition, the other portion of the select line is formed with the wiring in the wiring layer over the gate electrodes. Therefore, the capacitance and resistance of the select line are also reduced.

The display device shown in FIGS. 1 and 2 is constructed using three metal wiring layers including the light blocking layer 36 and the layer for forming the pixel electrodes 38. In this case, the signal line 14 and the wiring 19 to construct the select line 18 are forming in the same wiring layer (the first wiring layer 16). As a result, portions of the select line 18 those intersect with the signal lines 14 should be made with the gate electrode 17.

If one more wiring line is utilized, it becomes possible to form the signal line 14 and the wiring 19 of the select line 18 in different wiring layers. In this case, the select line can be constructed with the wiring 19 extending in the second direction throughout the array of the display elements and the gate electrodes 17 of the transistors in the display elements arranged in the second direction that are connected to the wiring 19. As a result, the resistance of the select line can be further reduced.

Production steps such as explained below can be utilized to form the display device shown in FIGS. 1 and 2.

At first, N and P wells (not shown) are formed in necessary portions in the surface of a p⁻-type semiconductor substrate 30, and the isolation regions 15, for isolating between the active regions of the transistors and capacitors, are formed on the surface of the substrate. Next, the common diffusion region 20 of the capacitors 24 and 28 is formed on the surface of the substrate 30 by an ion implantation of, for example, boron ions.

If the driver circuit in each display element is constructed with N- and P-channel transistors, P and N wells should be formed in the area of the surface of the substrate provided for forming individual display element before forming the common diffusion region 20. That is, in this case, the P and N wells divide the surface area of the substrate for forming each display element.

If the driver circuit is constructed with only one type of transistor, on the other hand, it is not necessary to form wells within the individual display element. For example, if the driver circuit is constructed with an N channel transistor alone, a single P well covering the entire area for forming the array of display elements can be formed and the transistors in all the display elements can be formed in this common P well. In this case, the entire surface area of the substrate 30 for forming each of the display elements has the same conduction type (i.e., P type), before forming the common diffusion region 20.

Subsequently, an insulating film for forming the gate and capacitor insulating films is formed by, for example, a thermal oxidation of the surface of the semiconductor substrate 30. Then, a polycrystalline silicon film and a metal silicide film are deposited on the insulating film and patterned to form the gate electrodes 17 of the transistors 10, 11, and 13 and the capacitor electrodes 22 and 26. Next, source and drain diffusion regions of the transistors 10, 11 and 13 are formed in the surface of the substrate 30 by an ion implantation of, for example, arsenic ions. Thus, transistors 10, 11 and 13 and capacitors 24 and 28 of the display elements are formed on the surface of the semiconductor substrate 30.

After forming the transistors and capacitors, a thick insulating film is deposited by, for example, a chemical vapor deposition on the entire surface of the substrate on which the transistors and capacitors are formed, and planarized to form a first interlayer dielectric film. Contacts 12a, 12b, 12c, and so on are formed by opening contact holes in necessary portions of the first interlayer dielectric film and by filling the contact holes with plugs. Thereafter, a metal film such as an aluminum alloy film is deposited and patterned to form a first wiring layer 16.

Similarly, the second interlayer dielectric film and vias 32 and the second wiring layer (light blocking layer 36) are formed. Finally, the third interlayer dielectric film and vias 34 and third wiring layer (pixel electrodes 38) are formed. Thus, the driver layer of the display device is fabricated.

A plurality of display devices formed by the processing steps explained above are arranged on the surface of the semiconductor substrate 30 to form a display region of the display device. A signal-processing region including circuitry for receiving image signals and for generating and supplying select and pixel signals to the display region is also formed on the same substrate 30 in the periphery of the display region.

As explained above, transistors and capacitors in the display region must be tolerant of high voltages between 10 to 20 volts and are formed by a process for forming high-voltage tolerant devices. On the other hand, transistors in the signal-processing region need not be tolerant to such high voltages. Therefore, the signal-processing region is formed on the semiconductor substrate 30 by processing steps of an ordinary CMOS process, separately from the formation of the display region.

In this embodiment, as shown in FIG. 1, display elements, each containing the transistor, the capacitor, and the pixel electrode are arranged in the direction of the select line 18 (which in this case is the horizontal direction). Also in this embodiment, the display elements are arranged in the direction of the signal line 14 (which in this case is the vertical direction). That is, the display elements are arranged in the form of a two-dimensional array in the first and second directions as shown in FIG. 3, thus forming the display region of the liquid crystal display device of this invention.

Figure 3:
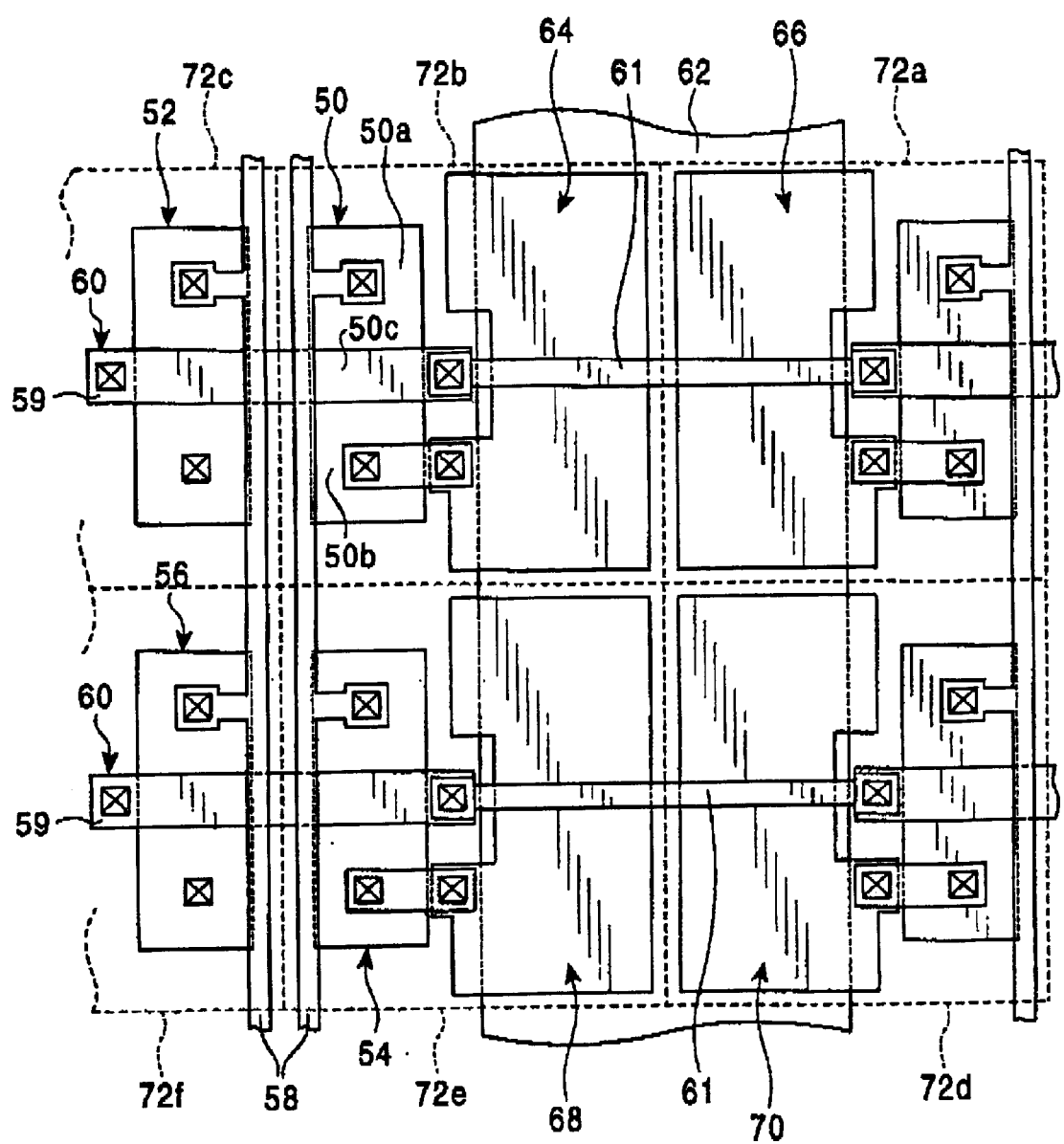
FIG. 3 is a plan view schematically showing the liquid crystal display device according to the first embodiment of the present invention.

Referring to FIG. 3, a transistor 50 and a capacitor 64, which are enclosed by the broken line 72b, for example, form a liquid crystal driver for one pixel. In FIG. 3, an upper electrode of a capacitor connected to the drain of a transistor 52 and wiring between them is omitted.

In FIG. 3, six pixel display elements, i.e., a first, a second, a third, a fourth, a fifth, and a sixth display elements enclosed by the broken line 72a, 72b, 72c, 72d, 72e, and 72f, respectively, are shown. The first, the second, and the third display elements are arranged adjacent to each other in the second direction. The fourth, the fifth, and the sixth display elements are arranged adjacent to each other in the second direction. Further, the fourth, the fifth, and the sixth display elements are arranged adjacent to the first, the second, and the third display elements, respectively, in the first direction.

As shown in FIG. 3, in the liquid crystal display device of the this embodiment, the pixel display elements are arranged so that the capacitors 64, 66, 68, and 70 are adjacent to one another both in the first (vertical) and the second (horizontal) directions. The diffusion regions forming lower electrodes of the capacitors 64, 66, 68, and 70 are merged with each other, and hence a single common diffusion region 62 is provided.

That is, the capacitor diffusion regions of the capacitors 64 and 66 of the first and the second display elements are formed extending along the border (vertical border) between the two display elements and merge with each other at the border. The capacitor diffusion regions of the capacitors 68 and 70 of the fourth and the fifth display elements are formed extending along the border between the two display elements and merge with each other at the border. Further, the capacitor diffusion regions of the first and the fourth display elements merge with each other at the border (horizontal border) between the first and the fourth display elements, and the capacitor diffusion regions of the second and the fourth display elements merge with each other at the border between the second and the fourth display elements. As a result, the capacitor diffusion regions of the first, the second, the fourth and the fifth display elements merge with each other at the vertical and horizontal borders between these display elements to form the common diffusion region 62. In other words, the capacitors of the first, the second, the fourth and the fifth display elements share the common diffusion region 62.

In the layout shown in FIG. 3, the capacitor diffusion region extends to the entire vertical dimension of the display element, or, along an entire length of the vertical border between two adjacent display elements. And the capacitor diffusion region merges with another capacitor diffusion region in adjacent display elements arranged in the first direction (vertical direction). Therefore, the diffusion region extends in the first direction to an entire vertical dimension of the display element.

On the other hand, the capacitor electrode formed with polycide must be isolated from the capacitor electrode in the adjacent pixel element. Therefore, the capacitor electrode cannot extend to the entire vertical dimension of the display element. However, the capacitor electrode extends to substantially the entire vertical dimension of the display element, or extends along substantially the entire length of the vertical border. That is, although a space necessary to isolate the capacitor electrodes from each other is provided, the capacitor electrode extends to the entire remaining portion of the vertical dimension of the display element, or extends along the entire remaining portion of the border.

Further, as explained above, the space between the polycide electrodes can be reduced much smaller than the space necessary to isolate between diffusion regions. Therefore, an effective area of the capacitor, i.e., the area in which the diffusion region and the capacitor electrode face with other, can be significantly increased compared with the layout shown in FIG. 6, even though the capacitor electrodes must be isolated with each other.

The transistors 50, 52, 54, and 56 are arranged in the first and the second directions so as to be adjacent to one another. Each source (for example, the source 50a of the transistor 50) is connected to the signal line 58. Each drain (for example, a drain 50b of the transistor 50) is connected to the capacitor electrode. The wiring 61 connects the gate electrodes (for example, the gate electrode 59 forming the gate 50c of the transistor 50) to one another, and the select line 60 is formed.

Although a limited portion of the array is shown in FIG. 3, a large number of display elements are actually arranged in the first and the second directions to form the display region of the display device. The common diffusion region 62 extends in the first direction throughout the display region, or the array of the pixel elements.

Although FIG. 3 shows only one such common diffusion region 62, a plurality of common diffusion regions are actually formed and arranged in the second direction. For example, the capacitor diffusion regions (not shown) of the capacitors of the third and the sixth display elements, and those of the display elements arranged on the left of these display elements are merged with each other to form a second common diffusion region. Further, the capacitor diffusion regions of the display elements arranged on the right of the first and the fourth display elements and the diffusion regions of the display elements arranged on the right of these display elements are merged with each other to form a third common diffusion region. These common diffusion regions are arranged in the second direction with an interval of two adjacent display elements.

Between two adjacent common diffusion regions arranged in the second direction, transistors of two adjacent display elements are arranged. For example, transistors 50 and 52 of the second and the third display elements, and transistors 54 and 56 of the fifth and the sixth pixel display elements are arranged between the common diffusion region 62 and second common diffusion region explained above.

In the example shown in FIG. 3, capacitor diffusion regions of all the display elements arranged in the first direction (vertical direction) are merged. An isolation region is not provided between these capacitor diffusion regions. Therefore, even when the pixel size gets smaller, the area of the capacitors can be reliably obtained. In this case, a contact may be formed at an edge of the display region, or the array of the display elements, and an appropriate electric potential is supplied.

Figure 4:
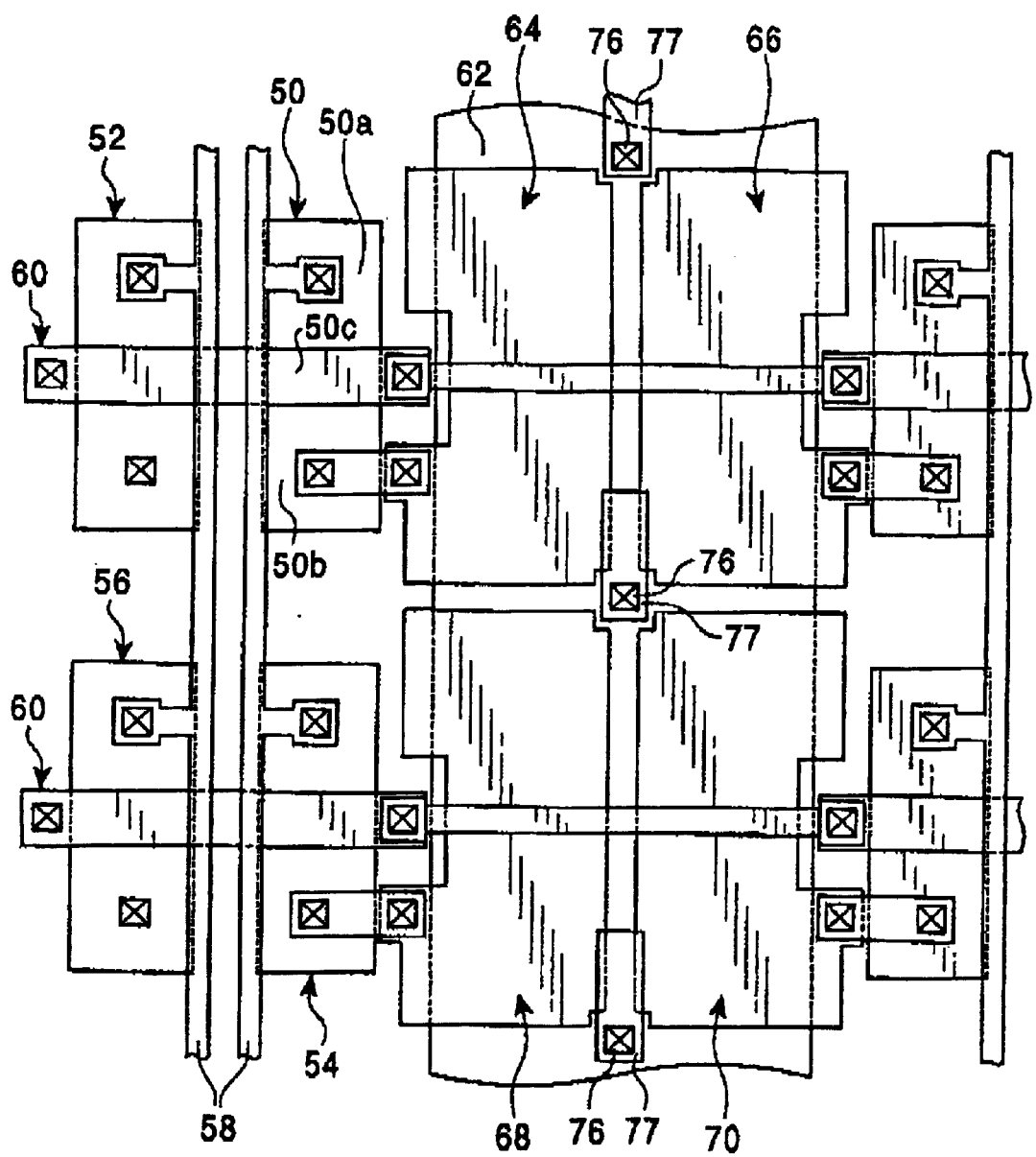
FIG. 4 is a plan view schematically showing a liquid crystal display device according to a second embodiment of the present invention.
Figure 5:
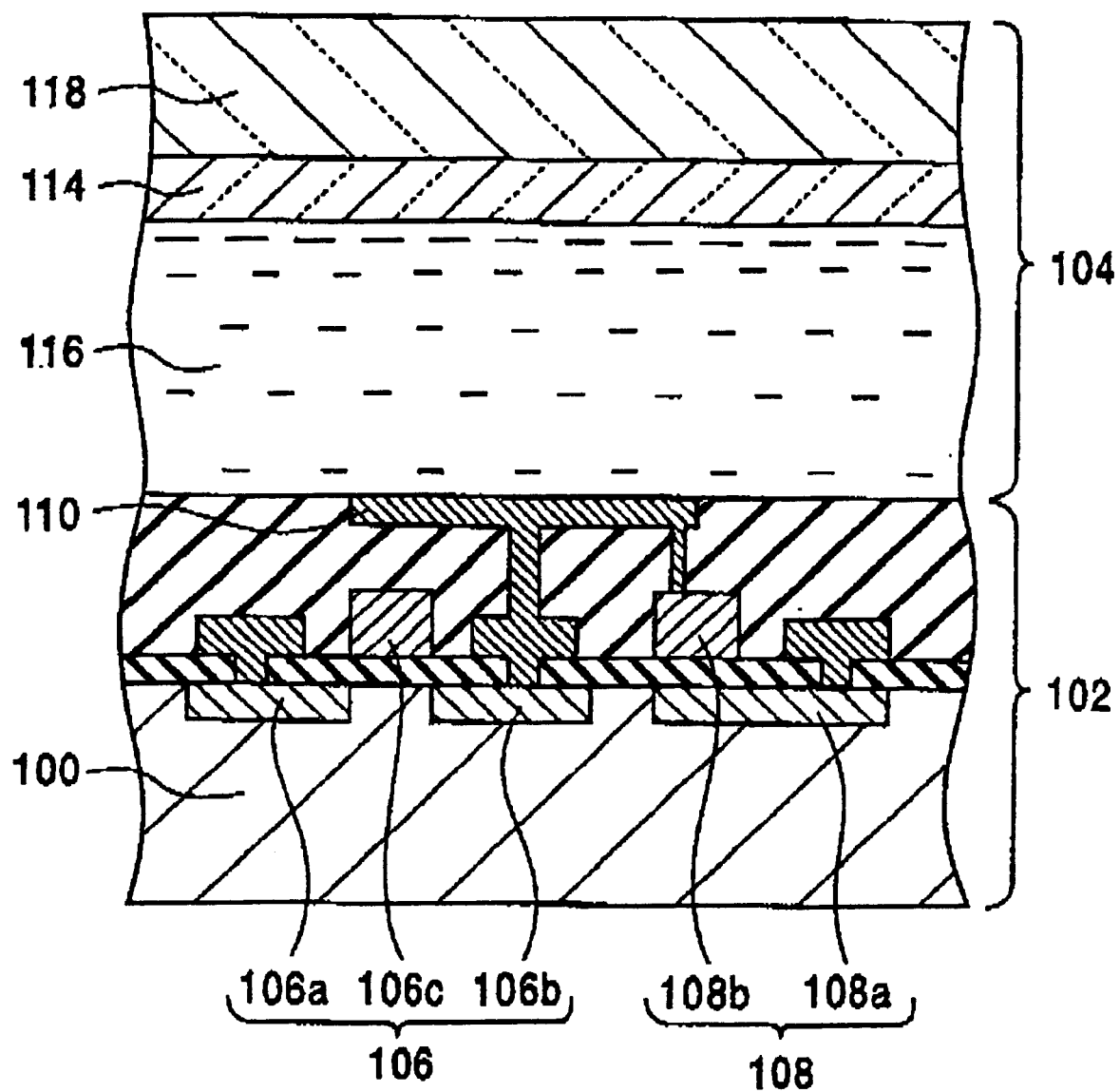
FIG. 5 is a sectional view showing the schematic structure of a known liquid crystal display device.

FIG. 4 is a plan view schematically showing an arrangement of the display device according to another embodiment of this invention. Similar to the embodiment shown in FIG. 3, the capacitor diffusion regions of the display elements adjacent with each other in the first and the second directions merge with each other to form the common diffusion region 62. Different from the embodiment shown in FIG. 3, however, contacts 76 are provided for the common diffusion region 62 at the positions surrounded by four capacitors (such as 64, 66, 68 and 70) that share the common diffusion region. More specifically, the contacts 76 are provided at positions surrounded by the capacitor electrodes. Each of the contacts 76 is used commonly for the four surrounding display elements and supplies the electric potential to the common diffusion regions. As a whole of the array of display elements shown in FIG. 4, one of the contacts 76 is provided for every two display elements.

Although not shown in FIG. 4, a heavily doped diffusion region is formed at the bottom of the contact 76 to reduce the contact resistance to the common diffusion region 62. Further, a wiring to supply the electric potential to the contact 76 is provided. For example, the contact 76 can be connected to the light blocking layer through the wiring 77 in the first wiring layer and a via (not shown). The ground potential, for example, can be supplied through the light blocking layer.

In the embodiment shown in FIG. 4, corners of the capacitor electrodes are cut to prevent shorting with the contact 76. Therefore, the area of the capacitor electrodes becomes smaller compared to the case shown in FIG. 3. By providing contacts within the array of display elements, however, the electric potential can be supplied uniformly to the capacitors of the display elements. Thereby, the operation of the display device can be stabilized.

Further, by providing the contacts at the positions surrounded by four capacitor electrodes commonly to the surrounding display elements, the space used for providing the contact is minimized and, thus, the reduction of the capacitor area is minimized. That is, in this case, although a space for providing the contact is spared, in addition to the space for isolating the capacitor electrodes from each other, along the vertical border between adjacent display elements, the space for providing the contact is minimized. And the capacitor electrode extends the entire remaining portion of the vertical border. Therefore, even in this case, the capacitor electrode extends along substantially an entire length of the vertical border between adjacent display elements.

If it not adversely affects the operation of the display elements, it is possible to reduce the number of contacts 76 provided for the common diffusion region 62. For example, it may be possible to provide one contact for every 4, 6, 8 or more even numbers of the display elements. Even in these cases, the contacts are preferably provided at the positions surrounded by the capacitor electrodes so as to minimize the reduction of the capacitance.

As described previously, in the case of the embodiment shown in FIG. 3, capacitor diffusion regions of all the display elements arranged in the first direction (vertical direction) are merged. It is also possible to isolate the capacitor diffusion regions of the display elements arranged in the first direction, while merging the capacitor diffusion regions of every two pixel display elements arranged adjacent with each other in the second direction. In this case, a contact is provided for each common diffusion region formed by merging two capacitor diffusion regions of the display elements arranged adjacent with each other in the second direction.

In this case, an isolation region should be provided between the capacitor diffusion regions arranged adjacent to each other in the first direction. Therefore, the diffusion region cannot extend along the entire length of the border between two adjacent display elements arranged in the second direction. However, diffusion regions should preferably extend along substantially an entire length of the border. That is, although a space necessary to isolate the diffusion regions from each other is provided, the diffusion region should preferably extend along the entire remaining portion of the border.

Alternatively, it is also possible to merge capacitor diffusion regions of two adjacent display elements arranged in the first direction. In fact, in this case, capacitor diffusion regions of four display elements adjacent with each other in the first and the second directions are merged at the vertical and horizontal borders between the display elements. By merging the capacitor diffusion regions of four display elements, it becomes possible to supply the electric potential to the common diffusion region through one common contact provided at the position surrounded by the four display elements. Therefore, the reduction of the capacitance can be minimized.

In this case, portions of the area along the vertical border between the display elements at which the capacitor diffusion regions merge with each other are used for purposes other than to form the capacitor diffusion regions and capacitor electrodes. That is, portions of the area along the vertical border are used to provide the common contact shared by the four surrounding display elements. The portions of the area along the vertical border are also used to provide isolation between common diffusion regions and between capacitor electrodes of the adjacent display elements arranged in the first direction. However, although these structures do not directly contribute to increase the capacitance, they are necessary to form or utilize the capacitors. Further, the capacitor diffusion regions and capacitor electrodes can extend along the entire remaining portion of the vertical border. That is, even in this case, the capacitor diffusion regions and the capacitor electrodes can extend along substantially an entire length of the vertical border at which the capacitor diffusion regions merge with each other.

On the other hand, it is not desirable to place other structures, which are not necessary to form or utilize the capacitors and occupy spaces in the layer same as the capacitor diffusion regions or the capacitor electrodes, in the area along the vertical border. Of course, however, different layers can be utilized for other purposes. For example, the first wiring layer is utilized to place wiring 19 or 61 that extends over the capacitor electrode beyond the vertical border between the display elements.

When the capacitor diffusion regions of the four display elements adjacent in the first and the second directions are merged, the common diffusion region extends in the first direction (vertical direction) to substantially an entire dimension of two adjacent display elements. It is further possible to merge capacitor diffusion regions of three, four or more display elements arranged adjacent to each other in the first direction, and an appropriate number of contacts can be provided at one or more of the positions surrounded by four of the display elements. In this case, the common diffusion region extends in the first direction to substantially an entire dimension of adjacent three, four, or more display elements.

While the liquid crystal display of the present invention has been described with reference to what are presently considered to be the preferred embodiments, it is to be understood that the invention is not limited to the disclosed embodiments. The invention is intended to cover various modifications and equivalent arrangements included within the spirit and scope of the claims.

In the embodiments shown in FIGS. 3 and 4, the display elements are not arranged back to back in the first direction (vertical direction), while arranging them back to back in the second direction (horizontal direction). It is also possible to arrange the display elements back to back in the both of the first and the second directions.

In FIGS. 1 and 3, broken lines show the areas of the display elements. Each of these broken lines show the area provided for forming a transistor and a capacitor of each of the display elements on the surface of the semiconductor substrate. The pixel electrode can also be placed over the same area provided for forming the transistor and the capacitor. It is also possible, however, to place the pixel electrode at a position shifted from the area provided for forming the transistor and the capacitor with a certain relationship.

In this case, the capacitor diffusion region of two adjacent display elements arranged in the second direction extend along the border between the areas of the two display elements provided for forming the transistors and capacitors, and merge with each other at the border. When the capacitor diffusion regions of two adjacent display elements arranged in the first direction are merged, they are merged at the border between the areas of the two display elements provided for forming the transistors and capacitors. Similarly, the common gate electrode extends beyond the border between the areas of two adjacent display elements arranged in the second direction provided for forming the transistors and capacitors.

In the embodiments shown in FIGS. 1 and 3, each of the display elements is formed in a square-shaped area shown by the broken line. However, it is also possible to form the display element in an area with a non-square shape.

Needless to say, the broken lines representing the areas of the display elements are shown in FIGS. 1 and 3 only for the purpose of facilitating the understanding. There is no such physical structure on the actual display device. However, a skilled person would readily understand the areas of the display elements and the borders between them in an actual device from the arrangement of the transistors and capacitors.

In the foregoing example, an N-channel transistor is provided for each display element, and the drain output is used to drive the pixel electrode. However, various other drive circuits can be adapted. For example, an N-channel transistor and a P-channel transistor can be arranged and connected in parallel, and the output thereof can be used to drive a pixel electrode.

In this case, however, areas for forming the two types of transistors including areas for forming two wells, within which two types of transistors are formed, are required in each of the display elements. Also, processing steps for forming the wells and the two types of transistors are needed to produce the display device. Therefore, it is preferable to form the drive circuit with only one type of transistors in order to increase the area that can be provided for the capacitor, and to minimize the cost of the display device.

Alternatively, as described in Japanese Patent Publication No. 2804198 (Laid-open Patent Hei 5-93922), first and second transistors are provided for each display element. A capacitor for storing the drain output and the gate of the second transistor are connected to the drain of the first transistor, and a pixel electrode is driven through the second transistor.

As has been explained in detail, according to an aspect of this invention, capacitor diffusion regions of adjacent display elements merge with each other without forming an isolation region between them. As a result, a sufficient area can be provided for forming the capacitor even when the pixel size is reduced, and therefore, the resolution of the display device can be improved without degrading the stability.

According to another aspect of this invention, capacitor diffusion regions of at least four display elements adjacent with each other in the first and the second directions merge with each other and a contact is provided at a position surrounded by the capacitor electrodes. As a result, an electric potential can be supplied through the contact uniformly to the capacitor diffusion regions without significantly reducing the capacitor, and therefore, the display device operates stably.

According to another aspect of this invention, transistors in adjacent display elements arranged in the second direction share a common gate electrode, and therefore, there is no need to provide contacts to connect the gate electrodes of these transistors with each other. As a result, the area required for placing the transistors is minimized, and a sufficient area can be provided for forming the capacitor even when the pixel size is reduced. In addition, capacitance and resistance of the signal line can be reduced.

According to still another aspect of this invention, a select line to select display elements arranged in the second direction includes a wiring extending over capacitor electrodes of adjacent two display elements arranged in the second direction. As a result, a dimension of the capacitor electrodes in the first direction can be maximized, and the capacitor can be maximized even when the pixel size is reduced. In addition, capacitance and resistance of the select line can be reduced.

Accordingly, the display system incorporating the display device produces high quality images with high resolution and high stability.

What is claimed is:

1. A display device formed on a surface of a semiconductor substrate, comprising:
   an array of display elements arranged in a first and a second direction, each of the display elements comprising:
      a transistor including a source and a drain diffusion region formed in the surface of the semiconductor substrate, the drain diffusion region outputting an output signal;
      a capacitor to store the output signal, the capacitor comprising a capacitor diffusion region formed in the surface of the semiconductor substrate, an insulating film disposed on the capacitor diffusion region, and a capacitor electrode disposed on the insulating film; and
      a pixel electrode disposed over the surface of the semiconductor substrate, the pixel electrode being driven by the output signal, wherein:
         the array of display elements includes a first display element, a second display element arranged adjacent to the first display element in the second direction, and a third display element arranged adjacent to the second display element in the second direction; and
         the capacitor diffusion regions of the first and the second display elements extend along at least substantially an entire length of a border between the first and the second display elements and merge with each other at the border.

2. The display device according to claim 1, wherein the capacitor electrodes of the first and the second display elements extend along substantially the entire length of the border between the first and the second display elements.

3. The display device according to claim 1, wherein the array of the display elements includes a plurality of signal lines extending in the first direction to input pixel signals to the display elements.

4. The display device according to claim 1, wherein an entire area of the surface of the semiconductor substrate provided for forming the first display element has a same conduction type before forming the capacitor diffusion region.

5. The display device according to claim 1, wherein the capacitor diffusion region of the first display element has a first conduction type and is formed in the surface of the semiconductor substrate having the first conduction type.

6. A display device formed on a surface of a semiconductor substrate, comprising:
   an array of display elements arranged in a first and a second direction, each of the display elements comprising:
      a transistor including a source and a drain diffusion region formed in the surface of the semiconductor substrate, the drain diffusion region outputting an output signal;
      a capacitor to store the output signal, the capacitor comprising a capacitor diffusion region formed in the surface of the semiconductor substrate, an insulating film disposed on the capacitor diffusion region, and a capacitor electrode disposed on the insulating film; and
      a pixel electrode disposed over the surface of the semiconductor substrate, the pixel electrode being driven by the output signal, wherein:
         the array of display elements includes a first display element, a second display element arranged adjacent to the first display element in the second direction, a third display element arranged adjacent to the second display element in the second direction, a fourth display element arranged adjacent to the first display element in the first direction and a fifth display element arranged adjacent to the second display element in the first direction, the fourth and the fifth display element are arranged adjacent with each other in the second direction;
         the capacitor diffusion regions of the first, the second, the fourth and the fifth display elements merge with each other; and
         a contact to supply an electric potential to the capacitor diffusion regions of the first, the second, the fourth, and the fifth display elements is provided at a position surrounded by the capacitor electrodes of the first, the second, the fourth, and the fifth display elements.

7. The display device according to claim 6, wherein the capacitor diffusion regions of the first and the second display elements extend along at least substantially an entire length of a border between the first and the second display elements.

8. The display device according to claim 6, wherein the capacitor electrodes of the first and the second display elements extend along substantially an entire length of a border between the first and the second display elements.

9. A display device formed on a surface of a semiconductor substrate, comprising:
   an array of display elements arranged in a first and a second direction, each of the display elements comprising:
      a transistor including a source and a drain diffusion region formed in the surface of the semiconductor substrate, the drain diffusion region outputting an output signal;
      a capacitor to store the output signal, the capacitor comprising a capacitor diffusion region formed in the surface of the semiconductor substrate, an insulating film disposed on the capacitor diffusion region, and a capacitor electrode disposed on the insulating film; and
      a pixel electrode disposed over the surface of the semiconductor substrate, the pixel electrode being driven by the output signal, wherein:
         the array of display elements includes a first display element, a second display element arranged adjacent to the first display element in the second direction, and a third display element arranged adjacent to the second display element in the second direction;
         the capacitor diffusion regions of the first and the second display elements extend along a border between the first and the second display elements and merge with each other at the border; and the transistors of the second and the third display elements share a common gate electrode extending in the second direction beyond a border between the second and the third display elements.

10. The display device according to claim 9, wherein:

the array of display elements includes a select line to select display elements arranged in the second direction including the first, the second, and the third display elements; and the select line includes the common gate electrode and a wiring connected to the common gate electrode, the wiring extends in the second direction over the capacitor electrodes of the first and the second display elements.

11. The display device according to claim 9, wherein:

the display elements includes a fourth display element arranged adjacent to the first display element in the first direction and a fifth display element arranged adjacent to the second display element in the first direction, the fourth and the fifth display element are arranged adjacent with each other in the second direction;

the capacitor diffusion regions of the first, the second, the fourth and the fifth display elements merge with each other; and a contact to supply an electric potential to the capacitor diffusion regions of the first, the second, the fourth, and the fifth display elements is provided at a position surrounded by the capacitor electrodes of the first, the second, the fourth, and the fifth display elements.

12. The display device according to claim 9, wherein the array of the display elements includes a plurality of signal lines extending in the first direction to input pixel signals to the display elements.

13. A display device formed on a surface of a semiconductor substrate, comprising:

an array of display elements arranged in a first and a second direction, each of the display elements comprising:

a transistor including a source and a drain diffusion region formed in the surface of the semiconductor substrate, the drain diffusion region outputting an output signal;

a capacitor to store the output signal, the capacitor comprising a capacitor diffusion region formed in the surface of the semiconductor substrate, an insulating film disposed on the capacitor diffusion region, and a capacitor electrode disposed on the insulating film; and a pixel electrode disposed over the surface of the semiconductor substrate, the pixel electrode being driven by the output signal, wherein:

the array of display elements includes a first display element, a second display element arranged adjacent to the first display element in the second direction, and a third display element arranged adjacent to the second display element in the second direction;

the capacitor diffusion regions of the first and the second display elements extend along a border between the first and the second display elements and merge with each other at the border; and the array of display elements includes a select line to select display elements arranged in the second direction including the first, the second, and the third display elements, the select line includes a wiring extending in the second direction over the capacitor electrodes of the first and the second display elements.

14. The display device according to claim 13, wherein the capacitor electrodes of the first and the second display elements extend along substantially an entire length of the border between the first and the second display elements.

15. The display device according to claim 13, wherein:

the display elements includes a fourth display element arranged adjacent to the first display element in the first direction and a fifth display element arranged adjacent to the second display element in the first direction, the fourth and the fifth display element are arranged adjacent with each other in the second direction;

the capacitor diffusion regions of the first, the second, the fourth and the fifth display elements merge with each other; and a contact to supply an electric potential to the capacitor diffusion regions of the first, the second, the fourth, and the fifth display elements is provided at a position surrounded by the capacitor electrodes of the first, the second, the fourth, and the fifth display elements.

16. A display system including a display device formed on a surface of a semiconductor substrate and a light source to illuminate the display device, the display device comprising:

an array of display elements arranged in a first and a second direction, each of the display elements comprising:

a transistor including a source and a drain diffusion region formed in the surface of the semiconductor substrate, the drain diffusion region outputting an output signal;

a capacitor to store the output signal, the capacitor comprising a capacitor diffusion region formed in the surface of the semiconductor substrate, an insulating film disposed on the capacitor diffusion region, and a capacitor electrode disposed on the insulating film; and a pixel electrode disposed over the surface of the semiconductor substrate, the pixel electrode being driven by the output signal, wherein:

the array of display elements includes a first display element, a second display element arranged adjacent to the first display element in the second direction, and a third display element arranged adjacent to the second display element in the second direction; and the capacitor diffusion regions of the first and the second display elements extend along at least substantially an entire length of a border between the first and the second display elements and merge with each other at the border.

17. The display system according to claim 16, wherein the capacitor diffusion region of the first display element has a first conduction type and is formed in the surface of the semiconductor substrate having the first conduction type.

18. A display system including a display device formed on a surface of a semiconductor substrate and a light source to illuminate the display device, the display device comprising:

an array of display elements arranged in a first and a second direction, each of the display elements comprising:

a transistor including a source and a drain diffusion region formed in the surface of the semiconductor substrate, the drain diffusion region outputting an output signal;

a capacitor to store the output signal, the capacitor comprising a capacitor diffusion region formed in the surface of the semiconductor substrate, an insulating film disposed on the capacitor diffusion region, and a capacitor electrode disposed on the insulating film; and a pixel electrode disposed over the surface of the semiconductor substrate, the pixel electrode being driven by the output signal, wherein:

the array of display elements includes a first display element, a second display element arranged adjacent to the first display element in the second direction, a third display element arranged adjacent to the second display element in the second direction, a fourth display element arranged adjacent to the first display element in the first direction and a fifth display element arranged adjacent to the second display element in the first direction, the fourth and the fifth display element are arranged adjacent with each other in the second direction;

the capacitor diffusion regions of the first, the second, the fourth and the fifth display elements merge with each other; and a contact to supply an electric potential to the capacitor diffusion regions of the first, the second, the fourth, and the fifth display elements is provided at a position surrounded by the capacitor electrodes of the first, the second, the fourth, and the fifth display elements.

19. The display system according to claim 18, wherein the capacitor diffusion regions of the first and the second display elements extend along at least substantially an entire length of a border between the first and the second display elements.

20. The display system according to claim 18, wherein the capacitor electrodes of the first and the second display elements extend along substantially an entire length of the border between the first and the second display elements.

21. A display system including a display device formed on a surface of a semiconductor substrate and a light source to illuminate the display device, the display device comprising:

an array of display elements arranged in a first and a second direction, each of the display elements comprising:

a transistor including a source and a drain diffusion region formed in the surface of the semiconductor substrate, the drain diffusion region outputting an output signal;

a capacitor to store the output signal, the capacitor comprising a capacitor diffusion region formed in the surface of the semiconductor substrate, an insulating film disposed on the capacitor diffusion region, and a capacitor electrode disposed on the insulating film; and a pixel electrode disposed over the surface of the semiconductor substrate, the pixel electrode being driven by the output signal, wherein:

the array of display elements includes a first display element, a second display element arranged adjacent to the first display element in the second direction, and a third display element arranged adjacent to the second display element in the second direction;

the capacitor diffusion regions of the first and the second display elements extend along a border between the first and the second display elements and merge with each other at the border;

the transistors of the second and the third display elements share a common gate electrode extending in the second direction beyond a border between the second and the third display elements.

22. The display system according to claim 21, wherein:

the array of display elements includes a select line to select display elements arranged in the second direction including the first, the second, and the third display elements; and the select line includes the common gate electrode and a wiring connected to the common gate electrode, the wiring extends in the second direction over the capacitor electrodes of the first and the second display elements.

23. The display system according to claim 21, wherein the array of the display elements includes a plurality of signal lines extending in the first direction to input pixel signals to the display elements.

24. A display system including a display device formed on a surface of a semiconductor substrate and a light source to illuminate the display device, the display device comprising:

an array of display elements arranged in a first and a second direction, each of the display elements comprising:

a transistor including a source and a drain diffusion region formed in the surface of the semiconductor substrate, the drain diffusion region outputting an output signal;

a capacitor to store the output signal, the capacitor comprising a capacitor diffusion region formed in the surface of the semiconductor substrate, an insulating film disposed on the capacitor diffusion region, and a capacitor electrode disposed on the insulating film; and a pixel electrode disposed over the surface of the semiconductor substrate, the pixel electrode being driven by the output signal, wherein:

the array of display elements includes a first display element, a second display element arranged adjacent to the first display element in the second direction, and a third display element arranged adjacent to the second display element in the second direction;

the capacitor diffusion regions of the first and the second display elements extend along a border between the first and the second display elements and merge with each other at the border; and the array of display elements includes a select line to select display elements arranged in the second direction including the first, the second, and the third display elements, the select line includes a wiring extending in the second direction over the capacitor electrodes of the first and the second display elements.

25. The display system according to any of claim 24, wherein the capacitor electrodes of the first and the second display elements extend along substantially an entire length of the border between the first and the second display elements.

* * * * *